(12) United States Patent
Ikada et al.

(10) Patent No.: US 12,048,967 B2
(45) Date of Patent: Jul. 30, 2024

(54) THROUGH-HOLE FORMING METHOD AND THROUGH-HOLE FORMING DEVICE

(71) Applicant: MITSUBISHI HEAVY INDUSTRIES, LTD., Tokyo (JP)

(72) Inventors: Akira Ikada, Tokyo (JP); Michinobu Takahagi, Tokyo (JP); Ryo Nakamura, Tokyo (JP); Yuki Tsukioka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/280,434

(22) PCT Filed: Oct. 10, 2019

(86) PCT No.: PCT/JP2019/039948
§ 371 (c)(1),
(2) Date: Mar. 26, 2021

(87) PCT Pub. No.: WO2020/105304
PCT Pub. Date: May 28, 2020

(65) Prior Publication Data
US 2022/0001460 A1    Jan. 6, 2022

(30) Foreign Application Priority Data
Nov. 22, 2018  (JP) ................................ 2018-219342

(51) Int. Cl.
*B23B 35/00* (2006.01)
*B23B 41/00* (2006.01)

(52) U.S. Cl.
CPC .............. *B23B 35/00* (2013.01); *B23B 41/00* (2013.01)

(58) Field of Classification Search
CPC . B23B 35/00; B23B 2228/00; B23B 2228/36; B23B 2228/52; B23B 2228/56; B23B 47/287; B23B 47/34
See application file for complete search history.

(56) References Cited

U.S. PATENT DOCUMENTS 5,139,376 A * 8/1992 Pumphrey .......... G05B 19/4015
                                                   408/1 R
5,213,454 A     5/1993 Givler et al.
(Continued)

FOREIGN PATENT DOCUMENTS

| EP | 1548083 A1 | 6/2005 |
| JP | 2014180872 A | 9/2014 |
| WO | 2012005356 A1 | 1/2012 |

OTHER PUBLICATIONS

International Search Report of International Application No. PCT/JP2019/039948 dated Dec. 24, 2019; 5pp.

*Primary Examiner* — Alan Snyder
(74) *Attorney, Agent, or Firm* — HAUPTMAN HAM, LLP

(57) ABSTRACT

The purpose of the present invention is to, after a through-hole is formed in a plurality of members between which a sealant is applied, rapidly and easily remove the sealant flowing into the through-hole. This through-hole forming method is provided with: a step (S2) in which a cutting tool rotates about the axis thereof, thereby forming a through-hole in a plurality of members between which a sealant is provided; and a step (S4) in which after the through-hole is formed, the cutting tool continues the rotation about the axis thereof for a predetermined time or a predetermined number of rotations, thereby removing the sealant flowing into the through-hole.

8 Claims, 6 Drawing Sheets

(56) References Cited

U.S. PATENT DOCUMENTS

| | | | |
|---|---|---|---|
| 2005/0112344 A1* | 5/2005 | Redfern | H05K 3/0047 428/211.1 |
| 2007/0286693 A1* | 12/2007 | Cho | B23B 51/08 408/227 |
| 2013/0189043 A1 | 7/2013 | Uchiuzo et al. | |
| 2014/0272429 A1 | 9/2014 | Erickson | |

* cited by examiner

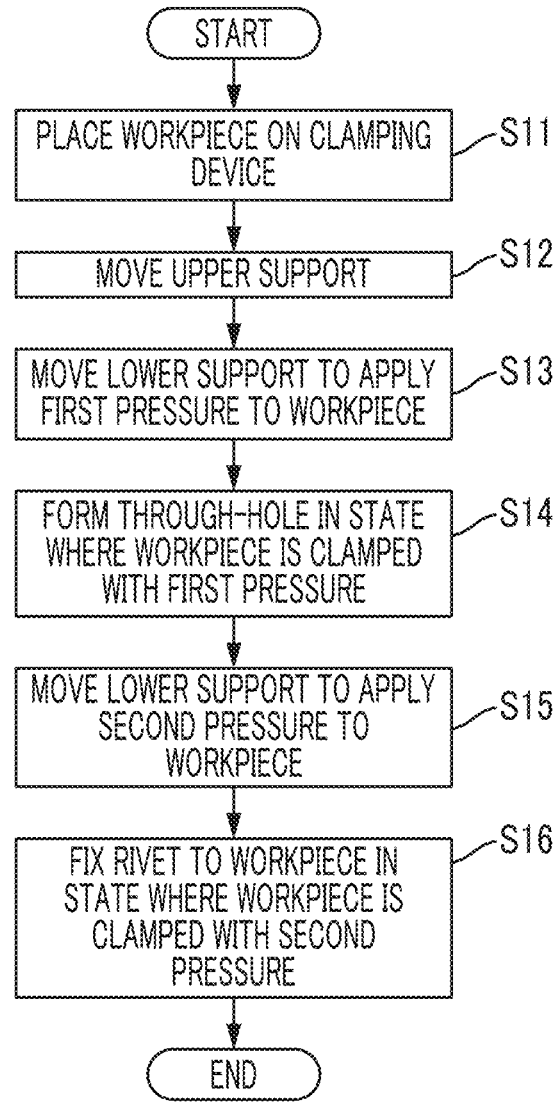

THROUGH-HOLE FORMING METHOD AND THROUGH-HOLE FORMING DEVICE

RELATED APPLICATIONS

The present application is a National Phase of International Application Number PCT/JP2019/039948 filed Oct. 10, 2019 and claims priority to Japanese Application Number 2018-219342 filed Nov. 22, 2018.

TECHNICAL FIELD

The present disclosure relates to a through-hole forming method and a through-hole forming device.

BACKGROUND ART

In a case where a plurality of plate members (for example, a skin) of an aircraft component are stacked, there is a case where a sealant as a fluid material is applied between the plurality of plate members. Particularly, in a case where the plate member is made of an aluminum alloy, a sealant needs to be applied for anti-corrosion. The stacked plate members are united with each other by a fastening component, such as a rivet.

A through-hole into which a rivet is to be inserted is formed in a plurality of plate members at once by a processing device, such as a drill, after a sealant is applied between plate members and the plate members are stacked. Since a layer to which the sealant is applied also faces the inside of the through-hole, the sealant may flow into the through-hole from spaces between the plate members after the through-hole is formed.

PTL 1 discloses a technique for removing chips, which are formed by machining and remain, by suction.

CITATION LIST

Patent Literature

[PTL 1] Specification of U.S. Pat. No. 5,213,454

SUMMARY OF INVENTION

Technical Problem

In a case where a rivet is riveted in a state where a sealant remains in a through-hole, the deformation of the rivet is hindered by the sealant and is insufficient. For this reason, a gap or a sealant layer is formed between the plate member and the rivet in the through-hole. As a result, since a load is transmitted to the rivet from the plate members at portions of the plurality of members, which are fixed by the rivet, other than the gaps or the sealant layers, a load cannot be transmitted using the entire outer periphery of the rivet. As a result, the strength of the stacked plate members is lower than a predetermined value. For this reason, in terms of maintaining the quality of riveting, it is necessary to form a through-hole, to remove a sealant from the inner surface of the through-hole, and then to fix a rivet.

A method of cleaning through-holes one by one by a worker is considered as a method of removing a sealant. However, automated work performed by a machine is interrupted between the formation of the through-hole and the riveting of the rivet. Further, there is a problem that effort and time are taken for cleaning performed by manual work.

Furthermore, the automation of work for removing a sealant from the inner surface of the through-hole is considered. However, a sealant cleaning head needs to be added to a machine in the related art that includes a drilling head and a riveting head. Further, since a head needs to be switched for each of work for forming a through-hole, work for cleaning a through-hole, and work for riveting a rivet, the number of times of switching a head is large despite automated work. For this reason, time is taken.

The present disclosure has been made in consideration of the above-mentioned circumstances, and an object of the present disclosure is to provide a through-hole forming method and a through-hole forming device that can rapidly and easily remove a fluid material flowing into a through-hole after the through-hole is formed in a plurality of members between which the fluid material is applied.

Solution to Problem

A through-hole forming method according to the present disclosure includes a step of rotating a machining tool about an axis thereof to form a through-hole in a plurality of members between which a fluid material is provided, and a step of continuing to rotate the machining tool about the axis for a predetermined time or by a predetermined number of rotations to remove the fluid material flowing into the through-hole after the through-hole is formed.

According to this configuration, the through-hole is formed in the plurality of members, between which the fluid material is provided, by the machining tool that is rotated about the axis thereof, and the machining tool continues to be rotated about the axis for a predetermined time or by a predetermined number of rotations after the through-hole is formed. As a result, the fluid material flowed into the through-hole from spaces between the plurality of members is removed.

In the through-hole forming method according to the aspect of the present disclosure, the predetermined time may be in a range of 0.1 seconds to 10 seconds and may be more preferably in a range of 1 second to 2 seconds.

In the through-hole forming method according to the aspect of the present disclosure, the predetermined number of rotations may be 5 or more and may be more preferably 100 or more.

In the through-hole forming method according to the aspect of the present disclosure, predetermined first pressure may be applied to the plurality of members to clamp the plurality of members while the through-hole is formed by the machining tool.

In the through-hole forming method according to the aspect of the present disclosure, predetermined second pressure lower than the first pressure may be applied to the plurality of members to clamp the plurality of members after the through-hole is formed.

A through-hole forming device according to another aspect of the present disclosure includes a machining tool that is rotated about an axis thereof, a drive unit that drives the machining tool, and a control unit that controls the drive unit; and the control unit includes a through-hole forming unit controlling the drive unit so that a through-hole is formed in a plurality of members between which a fluid material is provided, and a fluid material removing unit controlling the drive unit so that the machining tool continues to be rotated about the axis thereof by a predetermined number of rotations or for a predetermined time to remove the fluid material flowing into the through-hole after the through-hole is formed.

Advantageous Effects of Invention

According to the present disclosure, it is possible to rapidly and easily remove a fluid material flowing into a through-hole after the through-hole is formed in a plurality of members between which the fluid material is applied.

BRIEF DESCRIPTION OF DRAWINGS

FIG. 5 is a flowchart showing the operation of the clamping device according to the second embodiment of the present disclosure.

DESCRIPTION OF EMBODIMENTS

Embodiments of the present disclosure will be described below with reference to the drawings.

First Embodiment

Figure 1:
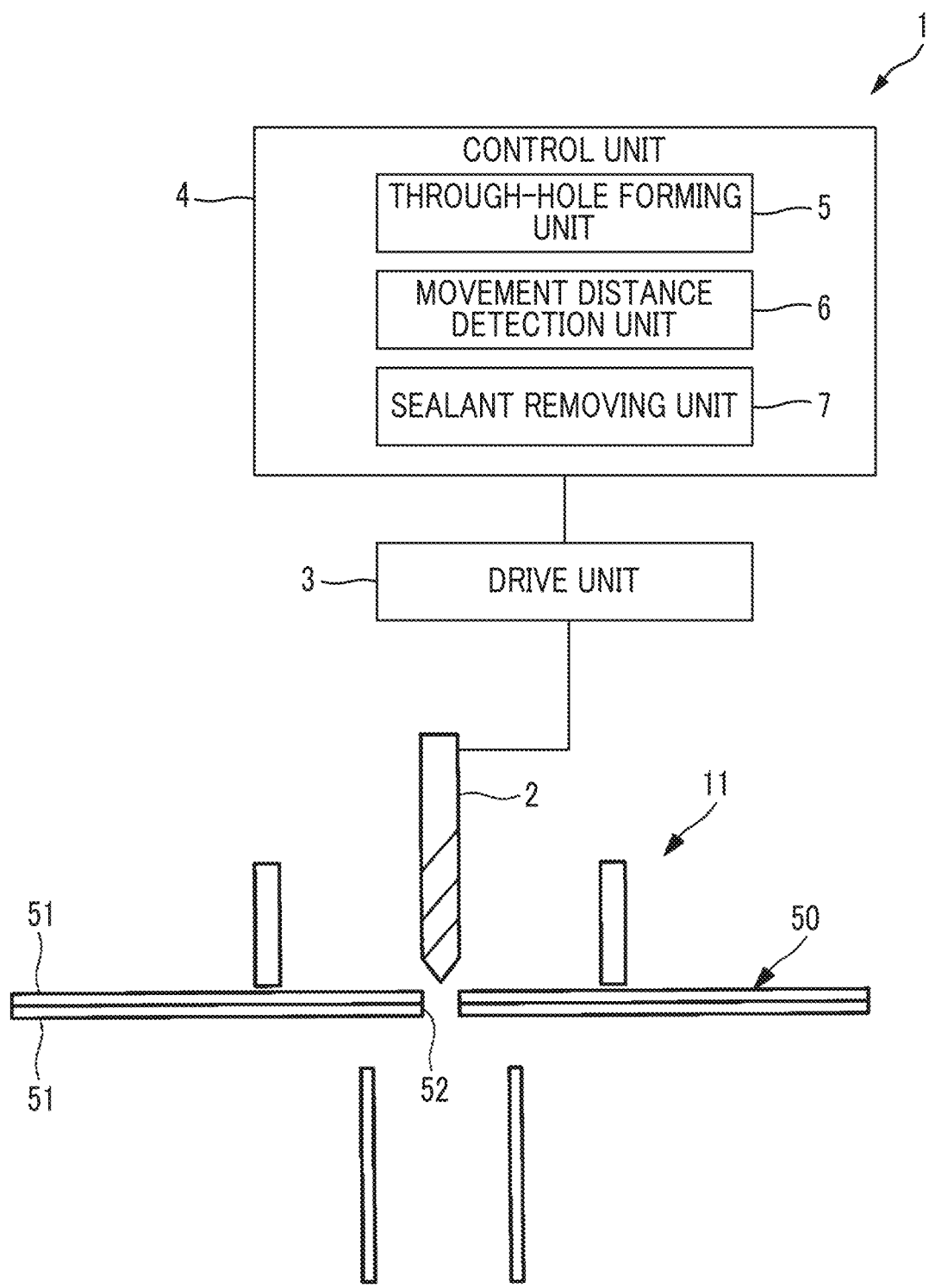
FIG. 1 is a schematic diagram showing a through-hole forming device according to a first embodiment of the present disclosure.

A through-hole forming device 1 according to a first embodiment of the present disclosure will be described below with reference to FIG. 1.

The through-hole forming device 1 includes, for example, a drill (machining tool) 2, a drive unit 3, and a control unit 4. The through-hole forming device 1 machines a workpiece 50 by the drill 2 to form a circular through-hole 52 in the workpiece 50. A rivet is inserted into and fixed to the through-hole 52 formed in the workpiece 50.

The workpiece 50 is, for example, a stack of a plurality of plate members 51, and a sealant (fluid material) is applied between the plurality of plate members 51. The plate member 51 is made of, for example, an aluminum alloy, a titanium alloy, a composite material, or the like. The through-hole 52 to which a rivet is fixed is formed in the workpiece 50.

The drill 2 is an example of a machining tool and can machine the workpiece 50 by being moved in a feed direction while being rotated about an axis thereof.

The drive unit 3 includes a spindle motor and a feed motor. The spindle motor receives power and is driven, and rotates the drill 2 about the axis. The feed motor receives power and is driven, and moves the drill 2 in an axial direction (feed direction). The drive unit 3 may not be driven by power, and may be hydraulically driven or pneumatically driven.

The control unit 4 includes, for example, a through-hole forming unit 5, a movement distance detection unit 6, a sealant removing unit (fluid material removing unit) 7, and the like.

The through-hole forming unit 5 controls the drive unit 3 so that the through-hole 52 is formed in the plurality of plate members 51 between which a sealant is provided. For example, the through-hole forming unit 5 sets a predetermined rotation speed and a predetermined feed speed for each through-hole 52 to be formed and drives the drill 2. The rotation speed of the drill 2 is in the range of, for example, 750 rpm to 18000 rpm.

The movement distance detection unit 6 detects the movement distance of the drill 2 in the axial direction during the rotation of the drill 2. The movement distance detection unit 6 can detect that the through-hole 52 continues to be formed using the drill 2 or can detect that the drill 2 has completely penetrated the plurality of plate members 51 and the through-hole 52 has been formed, depending on whether or not the drill 2 has been moved by a predetermined movement distance during the rotation of the drill 2, that is, whether or not the drill 2 has been moved by the plate thickness of the workpiece 50 in which the plurality of plate members 51 are stacked.

After the movement distance detection unit 6 detects that the through-hole 52 has been formed, the sealant removing unit 7 controls the drive unit 3 so that the drill 2 continues to be rotated about the axis thereof by a predetermined number of rotations or a predetermined time recorded in advance. Accordingly, since the drill 2 idles by the predetermined number of rotations or the predetermined time after the through-hole 52 is formed, the drill 2 scrapes a sealant flowing into the through-hole 52 out. As a result, the sealant is removed from the through-hole 52. The predetermined number of rotations is 5 or more and may be more preferably 100 or more. Further, the predetermined time is in the range of 0.1 seconds to 10 seconds and may be more preferably in the range of 1 second to 2 seconds.

The predetermined number of rotations or the predetermined time is recorded in a memory or the like in advance, and may be set for each combination of plate members 51 to be united. The predetermined number of rotations or the predetermined time is acquired in a case where whether or not the sealant flowing into the through-hole 52 has been removed is checked in a test or a simulation performed before actual manufacture.

The control unit 4 includes, for example, a Central Processing Unit (CPU), a Random Access Memory (RAM), a Read Only Memory (ROM), a computer-readable storage medium, and the like. Further, since a series of processing for realizing various functions are stored in a storage medium or the like in the form of a program by way of example, various functions are realized in a case where the CPU reads the program on the RAM or the like and performs processing/calculation of information. A form where a program is installed in a ROM or other storage mediums in advance, a form where a program is provided in a state where the program is stored in a computer-readable storage medium, a form where a program is delivered through wired or wireless communication means, and the like may be applied to the program. The computer-readable storage medium is a magnetic disk, a magneto-optical disk, a CD-ROM, a DVD-ROM, a semiconductor memory, or the like.

Next, the operation of the through-hole forming device 1 according to the present embodiment will be described with reference to FIG. 2.

A workpiece 50 and the through-hole forming device 1 are prepared to form a through-hole 52 in the workpiece 50 in which the plurality of plate members 51 are stacked (Step S1). For example, the workpiece 50 is installed on a clamping device 11 and the through-hole forming device 1 is moved to the workpiece 50 that is installed on the clamping device 11.

Then, the drill 2 is driven on the workpiece 50 at a predetermined rotation speed and a predetermined feed speed (Step S2) to form the through-hole 52 in the workpiece 50. In this case, the movement distance of the drill 2 in the axial direction during the rotation of the drill 2 is detected by the movement distance detection unit 6 and it is determined whether or not the formation of the through-hole 52 has been completed (Step S3). Since a sealant is applied between the plurality of plate members 51, the sealant flows into the through-hole 52 in a case where the through-hole 52 is formed.

The movement distance detection unit 6 detects that the through-hole 52 continues to be formed using the drill 2 or detects that the drill 2 has completely penetrated the plurality of plate members 51 and the through-hole 52 has been formed, depending on whether or not the drill 2 has been moved by a predetermined movement distance during the rotation of the drill 2, that is, whether or not the drill 2 has been moved by the plate thickness of the workpiece 50 in which the plurality of plate members 51 are stacked.

After the movement distance detection unit 6 detects that the through-hole 52 has been formed, the drill 2 continues to be rotated about the axis thereof by a predetermined number of rotations or a predetermined time recorded in advance (Step S4). After continuing to be rotated about the axis thereof by a predetermined number of rotations or a predetermined time recorded in advance, the drill 2 stops being rotated (Step S5). Since the drill 2 idles, the sealant flowing into the through-hole 52 is scraped out and is removed from the through-hole 52 during the idling.

According to the present embodiment, a sealant flowing into the through-hole 52 is removed by the drill 2 used to form the through-hole 52, regardless of manual work performed by a worker and automated work using a tool dedicated to removing a sealant. Accordingly, time and effort required to remove a sealant can be reduced between the formation of the through-hole 52 and the riveting of a rivet. Further, since the drill 2 may be used without the attachment of a tool dedicated to removing a sealant in a case where an automatic drilling/riveting machine is used, a sealant cleaning head does not need to be added to a machine including a drilling head and a riveting head.

The inventors obtained knowledge that, in a case where a predetermined amount of a certain sealant is applied, the sealant is reliably removed from the through-hole 52 in a case where the drill 2 continues to be rotated 100 or more rotations after the detection of the formation of the through-hole 52 in order to scrape the sealant flowing into the through-hole 52 out. That is, in a case where the number of rotations was less than 100, the sealant still remained in the through-hole 52. Further, the same removal effect as the removal effect obtained in the case where the number of rotations was 100 was obtained even in a case where the number of rotations was increased to 300, 500, or the like. In order to shorten work time, the number of rotations is preferably smaller and is preferably set to 100. A result about the number of rotations may vary depending on the type or the amount of sealant to be applied.

Further, the inventors obtained knowledge that the sealant is reliably removed from the through-hole 52 in a case where the drill 2 continues to be rotated for 1 second or more after the detection of the formation of the through-hole 52 in order to scrape the sealant flowing into the through-hole 52 out. That is, in a case where idling time was less than 1 second, the sealant still remained in the through-hole 52. Further, the same removal effect as the removal effect obtained in the case where idling time was set to 1 second was obtained even in a case where idling time is set to 1 second or more. In order to shorten work time, idling time is preferably shorter and is preferably set to 2 seconds or less. A result about idling time may vary depending on the type or the amount of sealant to be applied.

Second Embodiment

Next, a through-hole forming device 1 according to a second embodiment of the present disclosure will be described with reference to FIG. 3.

The method of removing a sealant described in the first embodiment is the same in the present embodiment. A method of clamping a workpiece 50 performed by operating a clamping device 11 is further added to the present embodiment as described later.

Figure 3:
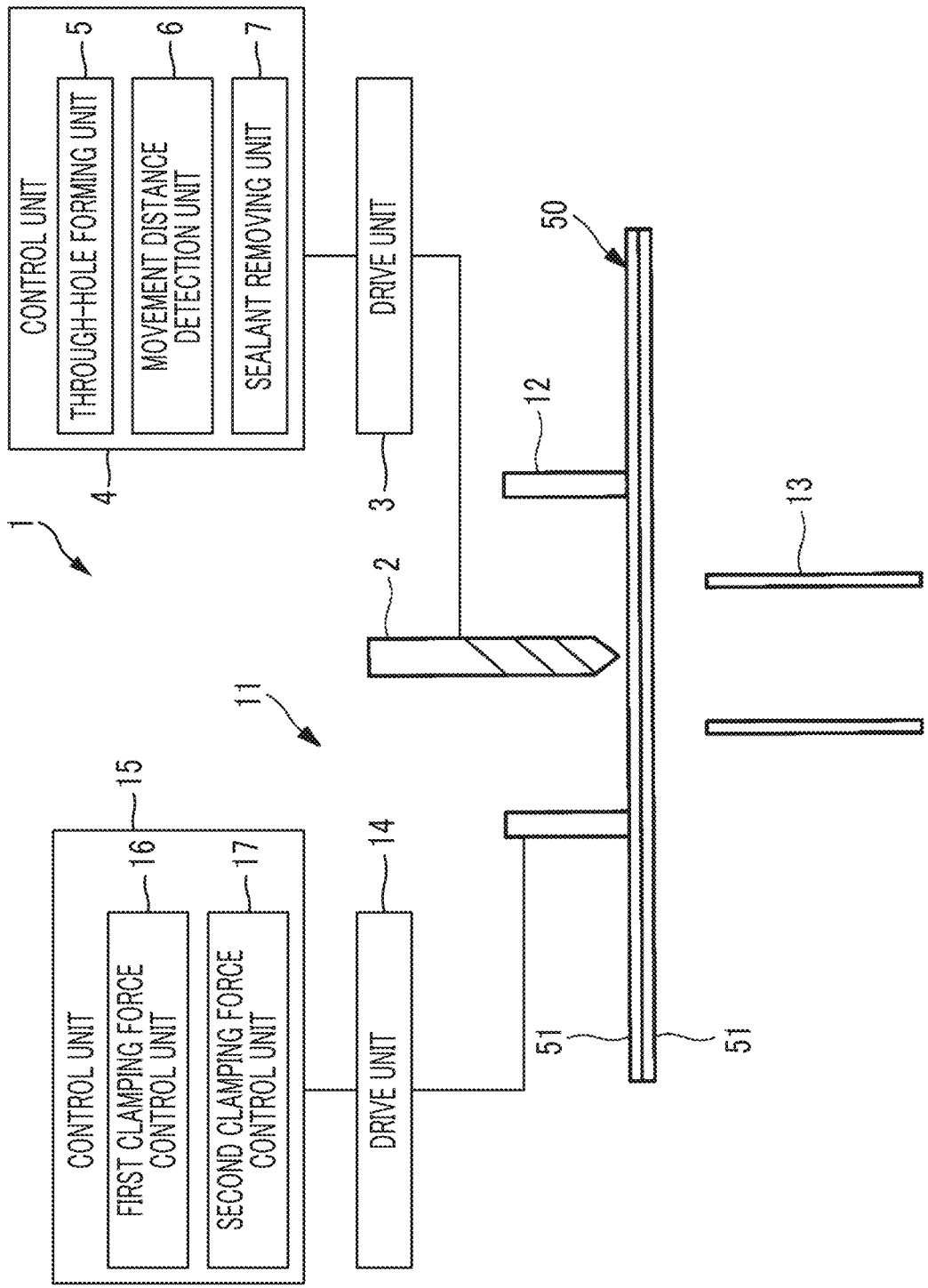
FIG. 3 is a schematic diagram showing a clamping device and a through-hole forming device according to a second embodiment of the present disclosure.

As shown in FIG. 3, the clamping device 11 includes an upper support 12, a lower support 13, a drive unit 14, a control unit 15, and the like. The clamping device 11 can clamp a workpiece 50 disposed between the upper support 12 and the lower support 13.

The upper support 12 includes a tubular member having, for example, a cylindrical shape and is disposed on the upper surface side of the workpiece 50. The upper support 12 supports the workpiece 50 at the lower end of the tubular member around a position where a through-hole 52 is to be formed.

The lower support 13 includes a tubular member having, for example, a cylindrical shape and is disposed on the lower surface side of the workpiece 50. The lower support 13 supports the workpiece 50 at the upper end of the tubular member around a position where a through-hole 52 is to be formed. The upper and lower supports 12 and 13 are adapted to be movable in a direction where the upper and lower supports 12 and 13 are separated from or approach the workpiece 50 by the drive unit 14.

As shown in FIGS. 4A to 4F, the drill 2 of the through-hole forming device 1 or an anvil (pressing part) 31 of a riveting device 30 passes through the tubular member of the upper support 12. The diameter of the tubular member of the upper support 12 is larger than the diameter of the tubular member of the lower support 13. For this reason, a position where the upper support 12 supports the workpiece 50 and a position where the lower support 13 supports the workpiece 50 are shifted from each other. Accordingly, there is a case where the workpiece 50 is bent upward in a convex shape in a case where first pressure is applied to the workpiece 50 as described later.

Figure 4A:
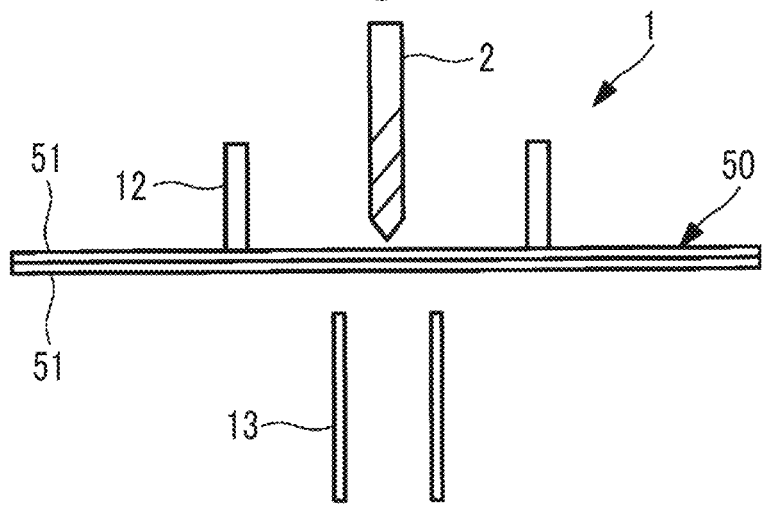
FIG. 4A is a schematic diagram showing the operation of the clamping device and the through-hole forming device according to the second embodiment of the present disclosure.
Figure 4B:
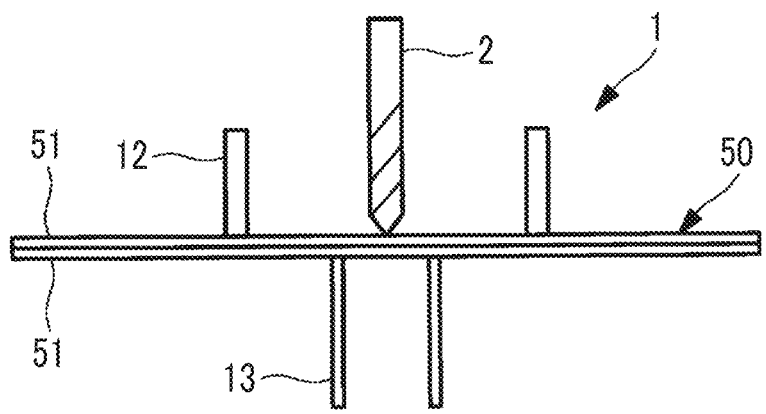
FIG. 4B is a schematic diagram showing the operation of the clamping device and the through-hole forming device according to the second embodiment of the present disclosure.
Figure 4C:
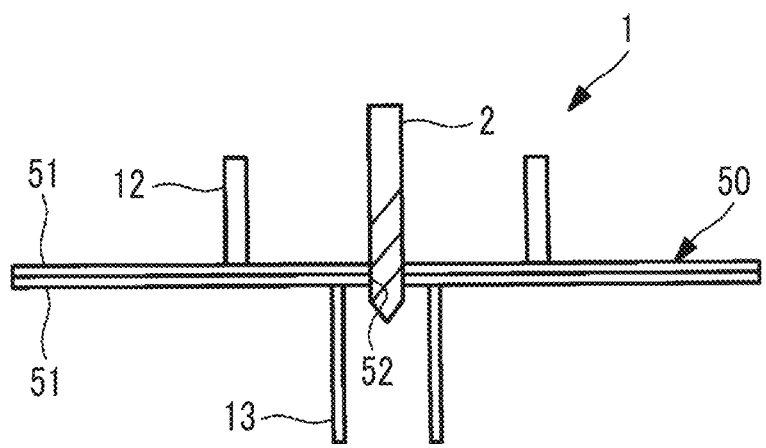
FIG. 4C is a schematic diagram showing the operation of the clamping device and the through-hole forming device according to the second embodiment of the present disclosure.
Figure 4D:
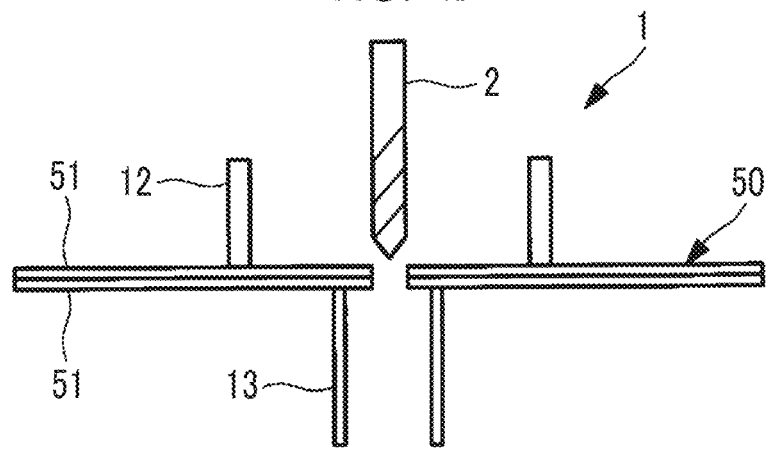
FIG. 4D is a schematic diagram showing the operation of the clamping device, the through-hole forming device, and a riveting device according to the second embodiment of the present disclosure.
Figure 4E:
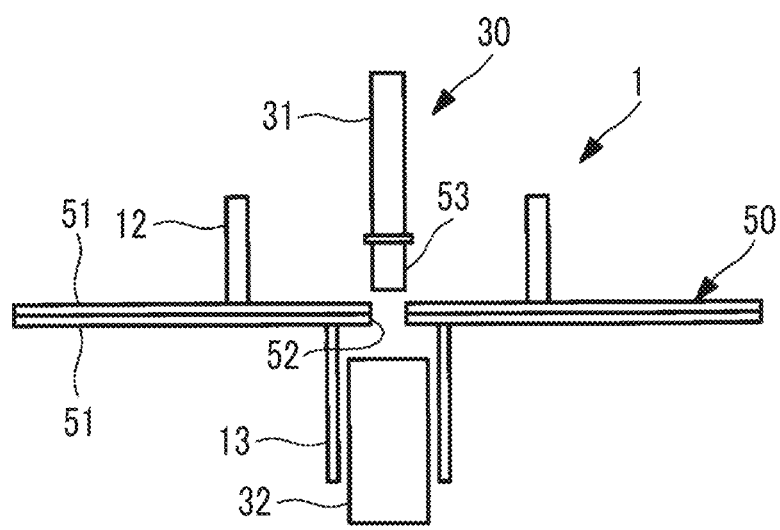
FIG. 4E is a schematic diagram showing the operation of the clamping device, the through-hole forming device, and the riveting device according to the second embodiment of the present disclosure.
Figure 4F:
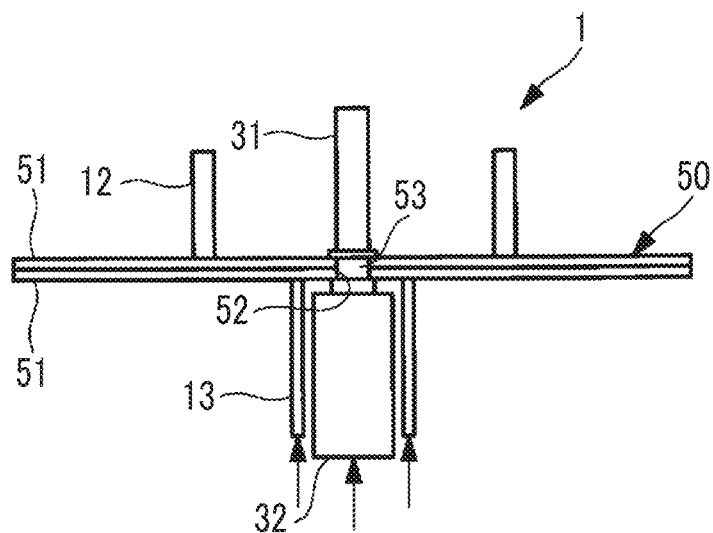
FIG. 4F is a schematic diagram showing the operation of the clamping device, the through-hole forming device, and the riveting device according to the second embodiment of the present disclosure.

As shown in FIGS. 4E and 4F, an anvil (pressing part) 32 of the riveting device 30 passes through the tubular member of the lower support 13. In a case where the diameter of the tubular member of the lower support 13 through which the drill 2 of the through-hole forming device 1 does not pass yet is set to be small, it is difficult for the lower support 13 to interfere with other components positioned around the lower support 13 during work for forming the through-hole 52 and work for riveting a rivet 53.

Each of the upper and lower supports 12 and 13 is not limited to a case where each of the upper and lower supports includes a tubular member having, for example, a cylindrical shape. Each of the upper and lower supports 12 and 13 may be adapted to support the workpiece 50 at one point on each of both sides of a position where the through-hole 52 is to be formed, that is, at a total of two points around the position where the through-hole 52 is to be formed. In this case, the support points of the upper support 12 are positioned outside the support points of the lower support 13 with respect to the position where the through-hole 52 is to be formed. For this reason, the positions where the upper support 12 supports the workpiece 50 and the positions where the lower support 13 supports the workpiece 50 are shifted from each other.

The drive unit 14 is, for example, a motor, and receives power and is driven and moves the upper and lower supports 12 and 13 in the axial directions of the tubular members of the upper and lower supports 12 and 13, respectively.

The control unit 15 includes, for example, a first clamping force control unit 16 and a second clamping force control unit 17.

The first clamping force control unit 16 controls the drive unit 14 so that the upper and lower supports 12 and 13 clamp the workpiece 50 in a state where the upper and lower supports 12 and 13 apply predetermined first pressure to the workpiece 50 while the through-hole 52 is formed in the workpiece 50, in which the plurality of plate members 51 are stacked, by the drill 2. For example, the first clamping force control unit 16 causes the lower support 13 to move to a preset position. Alternatively, the first clamping force control unit 16 causes the lower support 13 to move on the basis of the detection result of a detection unit that detects a load acting on the workpiece 50 due to the clamping of the upper and lower supports 12 and 13. As a result, a state where the predetermined first pressure is applied to the workpiece 50 is made.

In a case where the lower support 13 is caused to move to a preset position by the first clamping force control unit 16, a movement position may be recorded in a memory or the like in advance and may be set for each workpiece 50 to be clamped by the clamping device 11. The movement position is acquired through the check of the position of the lower support 13 at which a state where the predetermined first pressure is applied to the workpiece 50 is made in a test or a simulation that is performed before actual manufacture.

The predetermined first pressure is set to pressure that allows a sealant applied between the plurality of stacked plate members 51 to forcibly flow out to the through-hole 52.

The second clamping force control unit 17 controls the drive unit 14 so that the upper and lower supports 12 and 13 clamp the workpiece 50 in a state where the upper and lower supports 12 and 13 apply predetermined second pressure lower than the first pressure to the workpiece 50 until a fastening component inserted into the through-hole 52 is fixed to the plurality of plate members 51 by the riveting device 30 after the through-hole 52 is formed.

For example, the second clamping force control unit 17 causes the lower support 13 to move to a preset position. Alternatively, the second clamping force control unit 17 causes the lower support 13 to move on the basis of the detection result of the detection unit that detects a load acting on the workpiece 50 due to the clamping of the upper and lower supports 12 and 13. As a result, a state where the predetermined second pressure is applied to the workpiece 50 is made.

In a case where the lower support 13 is caused to move to a preset position by the second clamping force control unit 17, a movement position may be recorded in a memory or the like in advance and may be set for each workpiece 50 to be clamped by the clamping device 11. The movement position is acquired through the check of the position of the lower support 13 at which a state where the predetermined second pressure is applied to the workpiece 50 is made in a test or a simulation that is performed before actual manufacture.

It is preferable that the predetermined second pressure is set to pressure allowing the plurality of stacked plate members 51 not to be bent in a convex shape or a concave shape.

The control unit 15 includes, for example, a Central Processing Unit (CPU), a Random Access Memory (RAM), a Read Only Memory (ROM), a computer-readable storage medium, and the like. Further, since a series of processing for realizing various functions are stored in a storage medium or the like in the form of a program by way of example, various functions are realized in a case where the CPU reads the program on the RAM or the like and performs processing/calculation of information. A form where a program is installed in a ROM or other storage mediums in advance, a form where a program is provided in a state where the program is stored in a computer-readable storage medium, a form where a program is delivered through wired or wireless communication means, and the like may be applied to the program. The computer-readable storage medium is a magnetic disk, a magneto-optical disk, a CD-ROM, a DVD-ROM, a semiconductor memory, or the like.

Next, the operation of the clamping device 11 according to the present embodiment will be described with reference to FIGS. 4A to 4F and FIG. 5.

In order to clamp a workpiece 50 by the clamping device 11, the workpiece 50 in which the plurality of plate members 51 are stacked is placed on the clamping device 11 first as shown in FIG. 4A (Step S11).

After the workpiece 50 is installed, the upper support 12 is caused to approach the workpiece 50 from above to cause the lower end of the tubular member of the upper support 12 to be in contact with the workpiece 50 (Step S12).

Next, as shown in FIG. 4B, the lower support 13 is caused to approach the workpiece 50 from below to cause the upper end of the tubular member of the lower support 13 to be in contact with the workpiece 50. The lower support 13 is moved and the upper and lower supports 12 and 13 clamp the workpiece 50 so that a state where the upper and lower supports 12 and 13 apply predetermined first pressure to the workpiece 50 is made (Step S13).

Then, as shown in FIG. 4C, the drill 2 is driven in a state where the first pressure is applied to the workpiece 50 and the drill 2 forms a through-hole 52 in the workpiece (Step S14). In this case, as described in the first embodiment, the movement distance of the drill 2 in the axial direction during the rotation of the drill 2 is detected by the movement distance detection unit 6 and it is determined whether or not the formation of the through-hole 52 has been completed (Step S3 in FIG. 2). The movement distance detection unit 6 detects that the through-hole 52 continues to be formed using the drill 2 or detects that the drill 2 has completely penetrated the plurality of plate members 51 and the through-hole 52 has been formed, depending on the movement distance of the drill 2 in the axial direction during the rotation of the drill 2.

Figure 2:
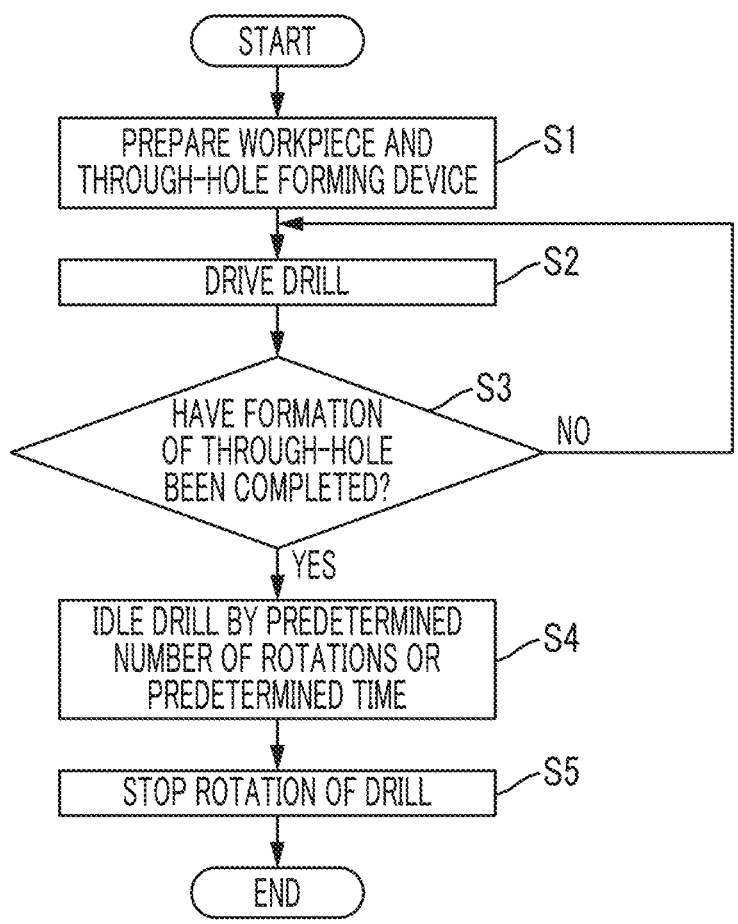
FIG. 2 is a flowchart showing the operation of the through-hole forming device according to the first embodiment of the present disclosure.

After the movement distance detection unit 6 detects that the through-hole 52 has been formed, the drill 2 continues to be rotated about the axis thereof by a predetermined number of rotations or a predetermined time recorded in advance (Step S4 in FIG. 2). After continuing to be rotated about the axis thereof by a predetermined number of rotations or a predetermined time recorded in advance, the drill 2 stops being rotated (Step S5 in FIG. 2). Since the drill 2 idles, the sealant flowing into the through-hole 52 is scraped out and is removed from the through-hole 52 during the idling.

The set value of the first pressure is a pressure that allows the sealant applied between the plurality of stacked plate members 51 to forcibly flow out to the through-hole 52. Accordingly, in a case where the through-hole 52 is formed in the plurality of plate members 51 and the drill 2 idles, the sealant flows out to the through-hole 52. As a result, it is possible to reduce a possibility that the sealant may flow into the through-hole 52 after the through-hole 52 is formed and the drill 2 is pulled out.

As shown in FIG. 4D, after the through-hole 52 is formed, the lower support 13 is moved and the upper and lower supports 12 and 13 clamp the workpiece 50 so that a state where the upper and lower supports 12 and 13 apply predetermined second pressure lower than the first pressure to the workpiece 50 is made (Step S15).

Since the predetermined second pressure is applied to the workpiece 50, a state where the plurality of stacked plate members 51 are not bent in a convex shape or a concave shape is made. Accordingly, since pressure applied between the plurality of plate members 51 is reduced, it is difficult for the sealant to flow out to the inside of the through-hole 52 from spaces between the plurality of plate members 51.

Next, in a state where the second pressure is applied to the workpiece 50, a rivet 53 is inserted into the through-hole 52 and the riveting device 30 fixes the rivet 53 inserted into the through-hole 52 to the workpiece 50 as shown in FIGS. 4E and 4F (Step S16). Since the plurality of plate members 51 are clamped with pressure lower than pressure to be applied to form the through-hole 52, the rivet 53 is fixed by the riveting device 30 in a state where the plurality of stacked plate members 51 are not bent in a convex shape or a concave shape.

As a result, since it is difficult for a gap to be formed between the rivet 53 and the plurality of plate members 51, the quality of riveting is improved. That is, in the plurality of plate members 51 fixed by the rivet 53, a load is not transmitted partially to the rivet 53 from the plate member 51 at a portion other than the gap and a load can be transmitted using the entire outer periphery of the rivet 53.

A case where the sealant is applied between the plurality of plate members 51 has been described in the embodiments, but the present disclosure is not limited to the embodiments. A fluid material applied between a plurality of members may be a synthetic resin such as an adhesive, oil and fat such as grease or rust inhibitor, and the like.

REFERENCE SIGNS LIST

1: through-hole forming device
2: drill (machining tool)
3: drive unit
4: control unit
5: through-hole forming unit
6: movement distance detection unit
7: sealant removing unit (fluid material removing unit)
11: clamping device
12: upper support
13: lower support
14: drive unit
15: control unit
16: first clamping force control unit
17: second clamping force control unit
30: riveting device
50: workpiece
51: plate member
52: through-hole
53: rivet

The invention claimed is:

1. A through-hole forming method comprising:
a step of rotating a machining tool about an axis thereof to form a through-hole in a plurality of members between which a fluid material comprising a sealant is provided; and
a step of continuing to rotate the machining tool about the axis for a predetermined time or by a predetermined number of rotations to remove the sealant flowing into the through-hole after the through-hole is formed, wherein
the through-hole is configured to receive a rivet to fix the plurality of members after the sealant flowing into the through-hole is removed.

2. The through-hole forming method according to claim 1, wherein the predetermined time is in a range of 0.1 seconds to 10 seconds.

3. The through-hole forming method according to claim 1, wherein the predetermined number of rotations is 5 or more.

4. The through-hole forming method according to claim 1, wherein the plurality of members comprise an aluminum alloy, titanium alloy, or composite.

5. The through-hole forming method according to claim 1, wherein the applying of the predetermined first pressure is performed by a first support, and the applying of the predetermined second pressure is performed by a second support.

6. The through-hole forming method according to claim 1, wherein predetermined first pressure is applied to the plurality of members to clamp the plurality of members while the through-hole is formed by the machining tool.

7. The through-hole forming method according to claim 6, wherein predetermined second pressure lower than the first pressure is applied to the plurality of members to clamp the plurality of members after the through-hole is formed.

8. A through-hole forming device comprising:
a machining tool that is rotated about an axis thereof;
a drive unit that drives the machining tool; and
a control unit that controls the drive unit,
wherein the control unit includes a through-hole forming unit controlling the drive unit so that a through-hole is formed in a plurality of members between which a fluid material comprising a sealant is provided, and a sealant removing unit controlling the drive unit so that the machining tool continues to be rotated about the axis thereof by a predetermined number of rotations or for a predetermined time to remove the sealant flowing into the through-hole after the through-hole is formed, and the through-hole is configured to receive a rivet to fix the plurality of members after the sealant flowing into the through-hole is removed.

\* \* \* \* \*